(12) United States Patent
Said et al.

(10) Patent No.: US 9,633,107 B2
(45) Date of Patent: Apr. 25, 2017

(54) MOBILE METADATA MODEL REPOSITORY

(75) Inventors: Baré Said, St. Leon-Rot (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 1211 days.

(21) Appl. No.: 13/311,859

(22) Filed: Dec. 6, 2011

(65) Prior Publication Data
US 2013/0144918 A1    Jun. 6, 2013

(51) Int. Cl.
*G06F 17/30* (2006.01)
*G06Q 10/06* (2012.01)

(52) U.S. Cl.
CPC ..... *G06F 17/30607* (2013.01); *G06Q 10/067* (2013.01)

(58) Field of Classification Search
None
See application file for complete search history.

(56) References Cited

U.S. PATENT DOCUMENTS

| 6,745,388 | B1 | 6/2004 | Gupta et al. | |
|---|---|---|---|---|
| 2005/0050141 | A1* | 3/2005 | An | H04L 67/02 709/203 |
| 2005/0234845 | A1 | 10/2005 | Okunseinde et al. | |
| 2009/0024652 | A1* | 1/2009 | Thompson et al. | 707/102 |
| 2010/0153335 | A1* | 6/2010 | Esteve Balducci | G06Q 10/107 707/610 |
| 2010/0161648 | A1* | 6/2010 | Eberlein | G06F 17/30525 707/769 |

OTHER PUBLICATIONS

Non-Final Office Action mailed Aug. 9, 2011, for U.S. Appl. No. 12/339,339, entitled "Metadata Model Repository", filed Dec. 19, 2008, 13pgs.

* cited by examiner

*Primary Examiner* — Son T Hoang
(74) *Attorney, Agent, or Firm* — Buckley, Maschoff & Talwalkar LLC

(57) ABSTRACT

A system includes creation of a first data structure defining a generic business object model in a storage medium of a first device, creation of a second data structure defining a specific business object model in the storage medium of the first device, where the specific business object model being an instance of the generic business object model, reception of the second data structure defining the specific business object model at a mobile device, and storage of the second data structure in a storage medium of the mobile device.

3 Claims, 8 Drawing Sheets

| Desktop Client | | | | | | | | | | | |
|---|---|---|---|---|---|---|---|---|---|---|---|
| Home | Business Analytics | Corporate Performance | Managing My Area | Business Configuration | Marketing | Account Management | New Business | Sales Orders | Customer Invoicing | Service Desk | |

Accounts

Overview
Accounts
Partners
Activities
Reports

Show | Modified View – All Accounts
Group By | None | Edit | New | Actions

| Status | Account ID | Account Name | City | Main Contact |
|---|---|---|---|---|
| Active | 1000000 | Innovat GmbH | Berlin | Schmitt, Marta |
| Active | 1000001 | Almika GmbH | Hannover | Jaeger, Katherina |
| Active | 1000030 | Submarines Unlimited Headquarters | Kiel | |
| Active | 1000031 | R10 Company R10 Comp Department | Walldorf | |
| Active | 1000032 | Irgendwas GmbH | Heidelberg | |
| Active | 1000033 | ZSTD – Company Administration | Berlin | |
| Active | 1000034 | Deployment Everywhere | Heidelberg | |
| Active | 1000035 | Mueller GmbH | Frankfurt | |

MOBILE METADATA MODEL REPOSITORY

FIELD

Some embodiments relate to enterprise applications based on metadata models and supported by a backend application platform. More specifically, some embodiments relate to development and consumption of mobile-specific metadata models.

BACKGROUND

Some business application platforms advantageously provide model-driven development of business applications. For example, instead of writing lines of program code, a developer may develop an application by defining business-oriented semantic models and their process flow. These "design time" entities are then transformed to executable coding (i.e., "runtime artifacts"), and the runtime artifacts are processed via appropriate runtime engines (e.g., an Enterprise Service Framework (ESF) for business object runtime artifacts or a user interface framework for floor plan runtime artifacts).

Commonly-assigned and co-pending U.S. application Ser. No. 12/339,339, filed Dec. 19, 2008 and entitled "Metadata Model Repository", describes a system which provides consistent and consolidated model-driven development of desktop business applications. Such a system is not suitable for the development of mobile versions of business applications, so mobile versions, if desired, must be hard-coded. Systems are desired to facilitate model-driven development of mobile device-tailored business applications for consumption by mobile devices.

BRIEF DESCRIPTION OF THE DRAWINGS

FIG. 5 is an outward view of a large-format user interface according to some embodiments.

DETAILED DESCRIPTION

Some embodiments support meta-data centric development of mobile business applications. Metadata models and object models are created or modified within a backend metadata model repository, which shares the same meta-metadata model as a metadata model repository located on a mobile device. The metadata models and object models may then be transferred to the mobile device and made available for model consumers on the mobile device.

By allowing reuse of already-available backend design time tools instead of requiring mobile-specific design time tools, some embodiments facilitate development and integration of online and offline mobile business applications which are consistent with corresponding desktop business applications. Some embodiments may also eliminate the need for model checks and validation on mobile devices, which are particularly resource-consuming.

Figure 1:
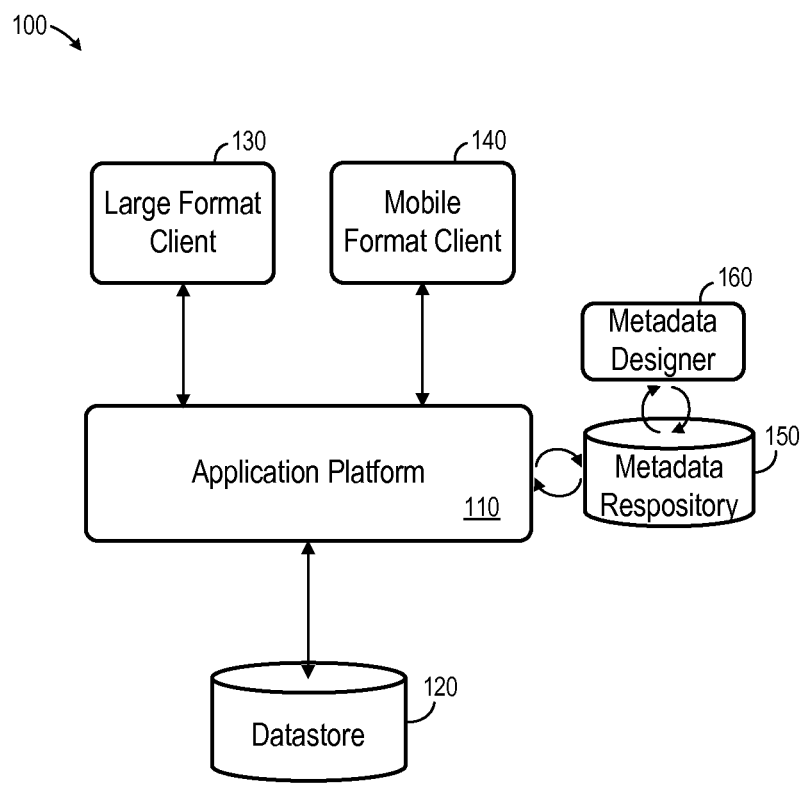
FIG. 1 is a block diagram of an enterprise system according to some embodiments.

FIG. 1 is a detailed block diagram of system 100 according to some embodiments. System 100 includes application platform 110, datastore 120, large format client 130, mobile format client 140, metadata repository 150 and metadata designer 160. FIG. 1 represents a logical architecture for describing some embodiments, and actual implementations may include more or different components arranged in any manner.

Application platform 110 may execute applications conforming to objects defined by metadata of repository 150. The applications may retrieve, create, modify and/or delete the data of object instances stored in datastore 120. Datastore 120 may comprise any one or more systems to store business data. Such systems include, but are not limited to, relational database systems, Online Analytical Processing (OLAP) database systems, data warehouses, application servers, and flat files.

Metadata repository 150 includes metadata models, each of which describes the structure and behavior of an object. The metadata models may be embodied in any type of data structure, including but not limited to eXtensible Markup Language files. The metadata models may describe, for example, a generic view, a generic floorplan (i.e., a user interface layout), a generic business object, a generic work center, generic UI texts, and generic process components, but embodiments are not limited thereto. These generic metadata models may be collectively referred to as metaobjects.

The business object metadata model represents real-world entities involved in business transactions. For example, an instance of the business object metadata model may represent a specific business document such as a sales order, a purchase order, or an invoice. An instance of the business object metadata model may also represent specific master data objects such as a product, a business partner, or a piece of equipment. Actual documents and master data objects (e.g., SalesOrder 504711, ACME corporation) are represented by instances of their representing specific business object (e.g., SalesOrder, Corporation), which in turn is an instance of a corresponding generic metadata model (e.g., Business Object).

Metadata repository 150 may also include metadata models (i.e., "generic" object models) and instances thereof (i.e., "specific" object models) which are particularly suited for consumption by a mobile device. For example, metadata repository 150 may include data defining a Mobile Floorplan metaobject as well as a Floorplan metaobject. Moreover, metadata repository 150 may include data defining a Mobile SalesOrder object model as well as a SalesOrder object model. The term "mobile" may refer to any device suitable for mobile usage, such as but not limited to a smartphone, a tablet computer, a dedicated device, and an e-reader, as well as any device including a display having a 10-in or smaller diagonal dimension and/or a touchscreen, whether or not the device is suited for mobile use.

Each of the metadata models of metadata repository 150 may comprise an instance of a same meta-metadata model. The meta-metadata model may consist of nodes, composite associations, associations, elements structure and attribute properties. The development of any metaobjects or object models of metadata repository 150 may therefore proceed using the same development technologies, thereby facilitating integration of the various specific object models.

According to some embodiments, the above-mentioned meta-metadata model is identical to the business object metadata model. In other words, the business object metadata model may comprise an instance of itself.

Metadata designer 160 may be operated by a developer to design metaobjects, object models and business applications based thereon. These business applications may be consumed by large format client 130 and mobile format client 140. Large format client 130 and mobile format client 140 may each comprise an application and/or computing device for communicating with application platform 110. Accordingly, a user may operate large format client 130 or mobile format client 140 to view, edit or otherwise interact with data of datastore 120 as provided by application platform 140.

As will be described in more detail below, such operation by mobile format client 140 may comprise consumption of metadata models defined within metadata repository 150. In some embodiments, this consumption is facilitated by the provision of a mobile metadata model repository residing on mobile format client 140.

Figure 2:
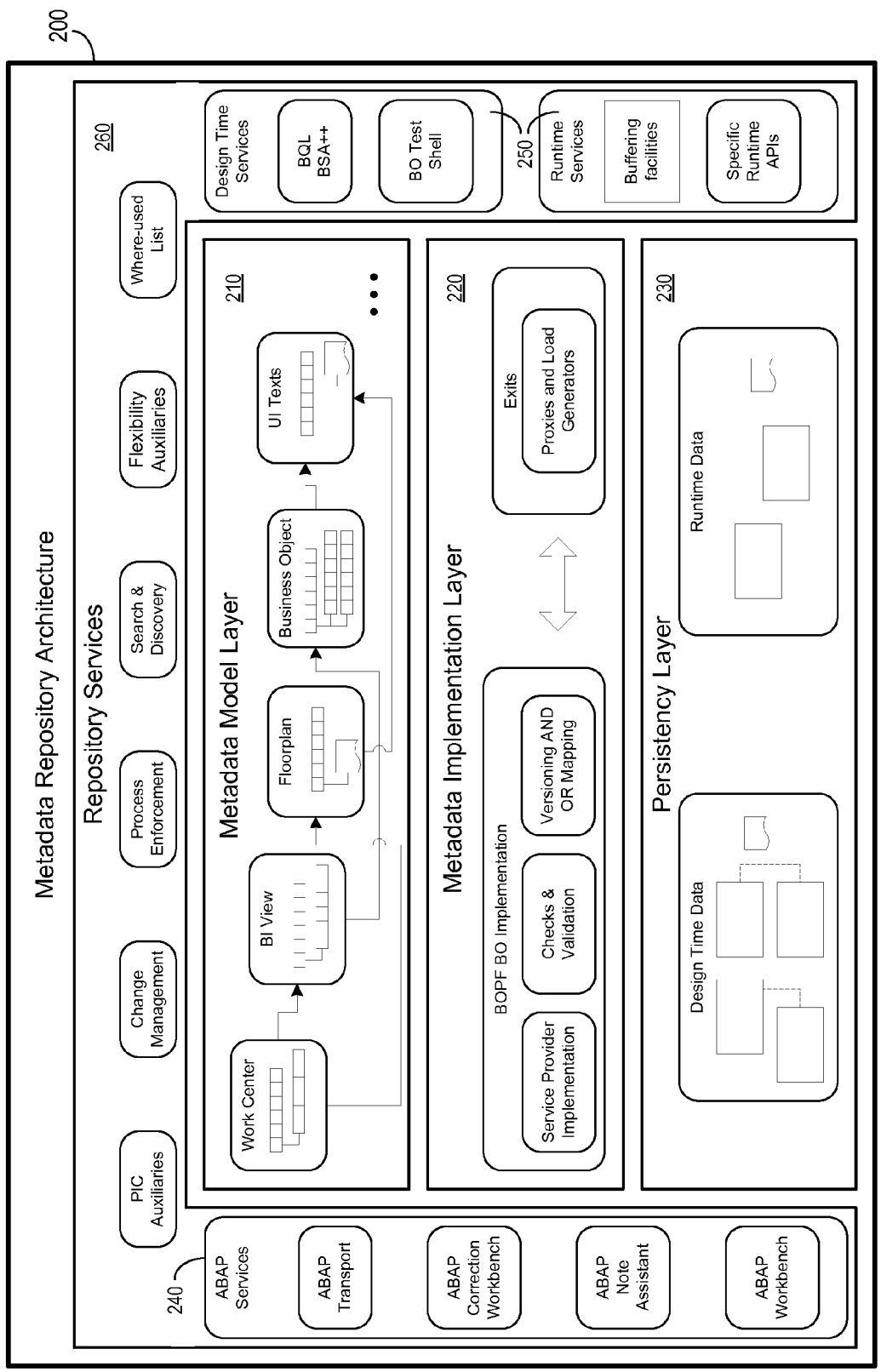
FIG. 2 is a block diagram illustrating a backend metadata repository architecture according to some embodiments.

FIG. 2 is a block diagram of metadata repository architecture 200 according to some embodiments. Metadata repository architecture 200 may comprise an implementation of metadata repository 150 according to some embodiments. Architecture 200 may be implemented using any number of computer devices, metadata models, object models and model instances may be embodied in any types of electronic data structures, and one or more processors may execute program code to perform processes described herein.

Metadata model layer 210 includes metadata models as described above, and illustrates logical dependencies between the metadata models. As also described above, each metadata model may comprise an instance of a meta-metadata model. Metadata implementation layer 220 includes a business object processing framework (BOPF) to implement specific object models derived from the metadata models of layer 210. Layer 220 may manage model instance persistencies as well as a lifecycle thereof. The BOPF may also implement model consistency constraints as is known.

The BOPF of metadata implementation layer 220 may generate appropriate database tables in persistency layer 230 to store data structures comprising object models (e.g., SalesOrder) derived from the metadata models of layer 210. Available database tables (e.g., optimized database tables or proxy data) may also be used and connected to the BOPF business object implementation. A persisted repository object model may also include unstructured data that may be referenced. Architecture 200 may therefore provide the capability to create, change and store different object models (as opposed to only the instances thereof) and to support their lifecycle management (e.g., shipment, change management, versioning).

ABAP services 240 represent a generic connection to ABAP services provided for all instances (i.e., object models) derived from the repository metadata models. Such services may include transport and correction tools and an ABAP development workbench. ABAP services 240 may be similar to corresponding ABAP services currently provided for business object instances.

Access layer 250 provides uniform mechanisms to access repository object models. For example, Business Query Language/BSA++ may be used to access design time aspects of the object models. During runtime, access layer may provide specific performance-optimized application programming interfaces and buffering facilities.

Architecture 200 therefore provides and supports functionality for creating and administrating metaobjects of metadata model layer 210 and corresponding object models defined by data structures stored in persistency layer 230. More specifically, some embodiments of architecture 200 provide generic facilities and frameworks to create define and edit metadata models (e.g., a UI entity metadata model or a process component entity metadata model) and associated object models, to integrate metadata models from different domains (e.g., UI, BO, BI Report), to create cross-model references and build relationships between metadata models and object models, to propagate metadata model and object model changes to different consumers, to perform live constraint checking during model creation, to support a model query language, to provide versioning and lifecycle management of metadata models and object models, and/or to extend metadata models in multi-client environments.

Figure 3:
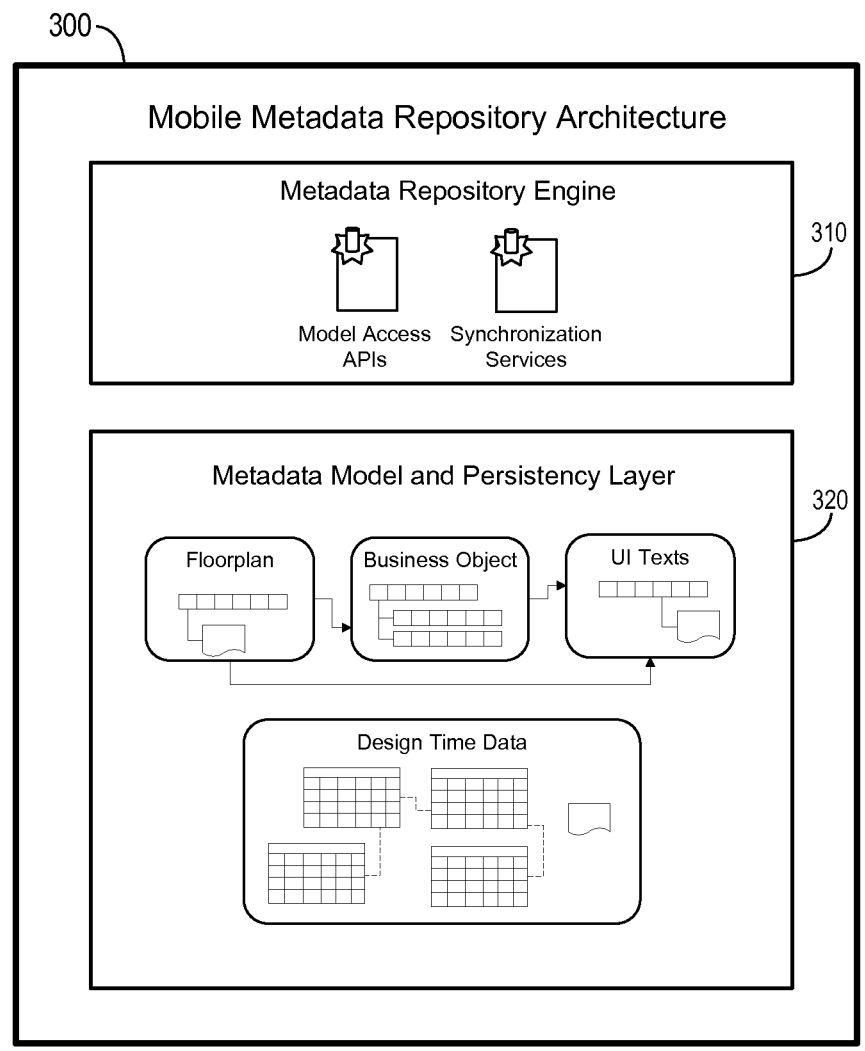
FIG. 3 is a block diagram illustrating a mobile metadata repository architecture according to some embodiments.

FIG. 3 illustrates elements of mobile metadata repository architecture 300 according to some embodiments. According to some embodiments, mobile format client 140 includes a metadata repository conforming to mobile metadata repository architecture 300. Consequently, some embodiments provide for synchronization with metadata models (e.g., Mobile Business Object) and corresponding object models (e.g., Mobile SalesOrder) developed within architecture 200, and for consumption of these models by mobile format client 140.

Architecture 300 does not include a metadata model implementation layer as shown in architecture 200, under the assumption that the metadata models and object models are created and administrated on application platform 110. Embodiments of architecture 300 may, of course, include all or a portion of such an implementation layer.

Metadata repository engine 310 includes Model Access APIs and Synchronization Services. The Model Access APIs may include generic APIs for standardized retrieval and access of metadata models and object models. Accordingly, any model consumers located on mobile format device 140 (e.g., model runtime engines or model runtime generators) may use the Model Access APIs to retrieve and access the locally-stored metadata models and object models.

The Synchronization Services offer a set of Web Services that are used to synchronize the metadata models and object models on mobile format device 140 with the corresponding active versions of the models within metadata repository 150. Therefore, changes to relevant metadata models and object models within metadata repository 150 are registered by the corresponding Synchronization Service of repository engine 310. Synchronization may be triggered explicitly on mobile format device 140 in order to transfer the active versions of metadata models and object models registered within repository architecture 300 from platform 110 to device 140, and to store the active versions in repository architecture 300. The Synchronization Service may also inform all registered model consumers of mobile format device 140 of changes to the stored model. For example, based on changes to relevant models, a model consumer may invalidate any runtime artifacts which were generated based on the prior versions of the relevant models.

Metadata model and persistency layer 320 includes metadata models and object models as described with respect to architecture 200. Again, all metadata models of architecture 300 (and of architecture 200) may comprise instances of a same meta-metamodel. The database schema of layer 320 contains separate tables for the different elements of the meta-metamodel such as nodes, node structures or associations. Therefore, data defining a specific metadata model or object model is accessed by retrieving the corresponding element instances from the different tables.

Figure 4:
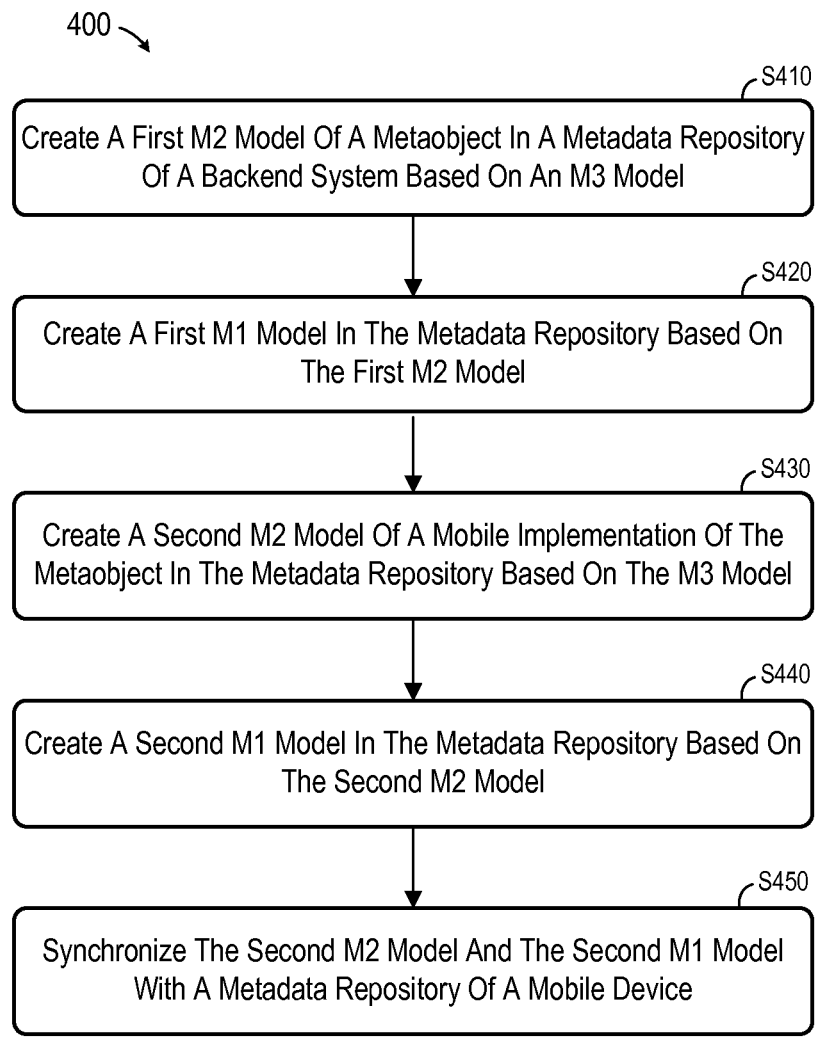
FIG. 4 is a flow diagram of a process according to some embodiments.

FIG. 4 comprises a flow diagram of process 400 according to some embodiments. In some embodiments, one or more computing devices of system 100 execute program code to perform process 400.

All processes mentioned herein may be embodied in processor-executable program code stored on one or more of non-transitory computer-readable media, such as a fixed disk, a floppy disk, a CD-ROM, a DVD-ROM, a Flash drive, and a magnetic tape. In some embodiments, hard-wired circuitry may be used in place of, or in combination with, program code for implementation of processes according to some embodiments. Embodiments are therefore not limited to any specific combination of hardware and software.

Initially, at S410, a first metaobject (i.e., "M2 model") is created in a metadata repository of a backend system. As described above, the M2 model is an instance of a particular meta-metadata model (i.e., "M3 model"). In one example of S410, a data structure defining a generic object model (e.g., a Floorplan metaobject) is created by executing program code of metadata designer 160 and metadata repository 150 and stored in a persistent storage of metadata repository 150. The data structure defines a structure and a set of determination and validation rules (i.e., the behavior) of the generic object model.

Next, at S420, a first object model (i.e., "M1 model") is created in the metadata repository based on the first M2 model. The M1 model may comprise an instance of the M2 model, and creation thereof may comprise executing program code of metadata designer 160 and metadata repository 150 to create a data structure defining the M1 model and to store the data structure in the persistent storage of metadata repository 150 (e.g., in persistency layer 230).

A second M2 model is created in the metadata repository of the backend system at S430. The second M2 model is also an instance of the particular M3 model of which the first M2 model is an instance. According to an example, the second M2 model is a mobile implementation first M2 model (e.g., a Mobile Floorplan metaobject), a data structure defining the second M2 object is created, and the data structure is stored in the persistent storage of metadata repository 150.

A second M1 model is created in the metadata repository at S440 based on the second M2 model. The second M1 model is an instance of the M2 model, and program code of metadata designer 160 and metadata repository 150 is executed to create a data structure defining the second M1 model and to store the data structure in the persistent storage of metadata repository 150 (e.g., in persistency layer 230).

Next, at S440, the second M2 model and the second M1 model are synchronized with a metadata repository of a mobile device. According to one example, the Synchronization Services of architecture 300 are invoked to receive the data structures defining the second M2 model and the second M1 model, and the Model Access APIs are of architecture 300 are used to store the data structures in a persistent storage of the mobile device (e.g., in layer 320). Consequently, the second M2 model and the second M1 model may be consumed by model consumers executed by the mobile device.

According to some embodiments, metadata repository architecture 200 is used to perform checks for validation, consistency and cross-references of the created M2 and M1 models. Mobile repository architecture 300 therefore does not require services to perform these functions. Rather, it is assumed that the M2 and M1 models which are synchronized to architecture 300 have already satisfied the relevant checks.

Some metadata models might not require a mobile-specific variant. That is, the same M2 model and corresponding M1 models may be created and consumed by application platform 110 and also persisted in layer 320 for consumption by a mobile device.

Figure 6:
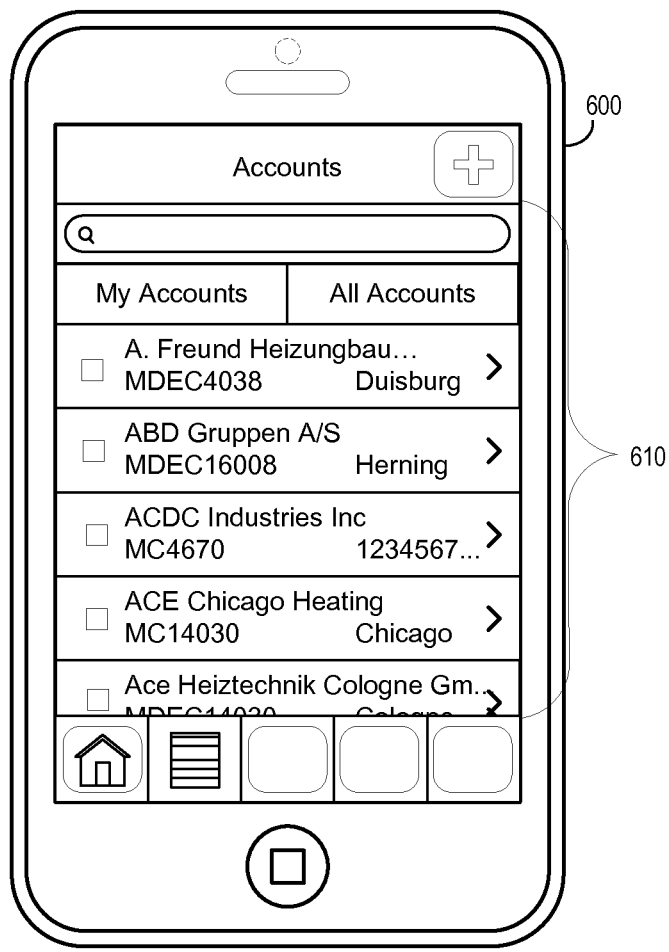
FIG. 6 is an outward view of a mobile-format user interface according to some embodiments.

FIG. 5 is an outward view of interface 500 according to some embodiments. Interface 500 may comprise an instance of an M1 model created at S420 according to some embodiments. The instance is consumed and displayed as interface 500 by a model consumer (e.g., a UI client) of large format device 130. In contrast, FIG. 6 is an outward view of mobile format device 600 displaying interface 610 according to some embodiments. Interface 610 may comprise an instance of an M1 model created at S440 according to some embodiments. The instance has been synchronized to a metadata model repository of device 600 and is consumed and displayed by a model consumer (e.g., a mobile UI client) of device 600.

Figure 7:
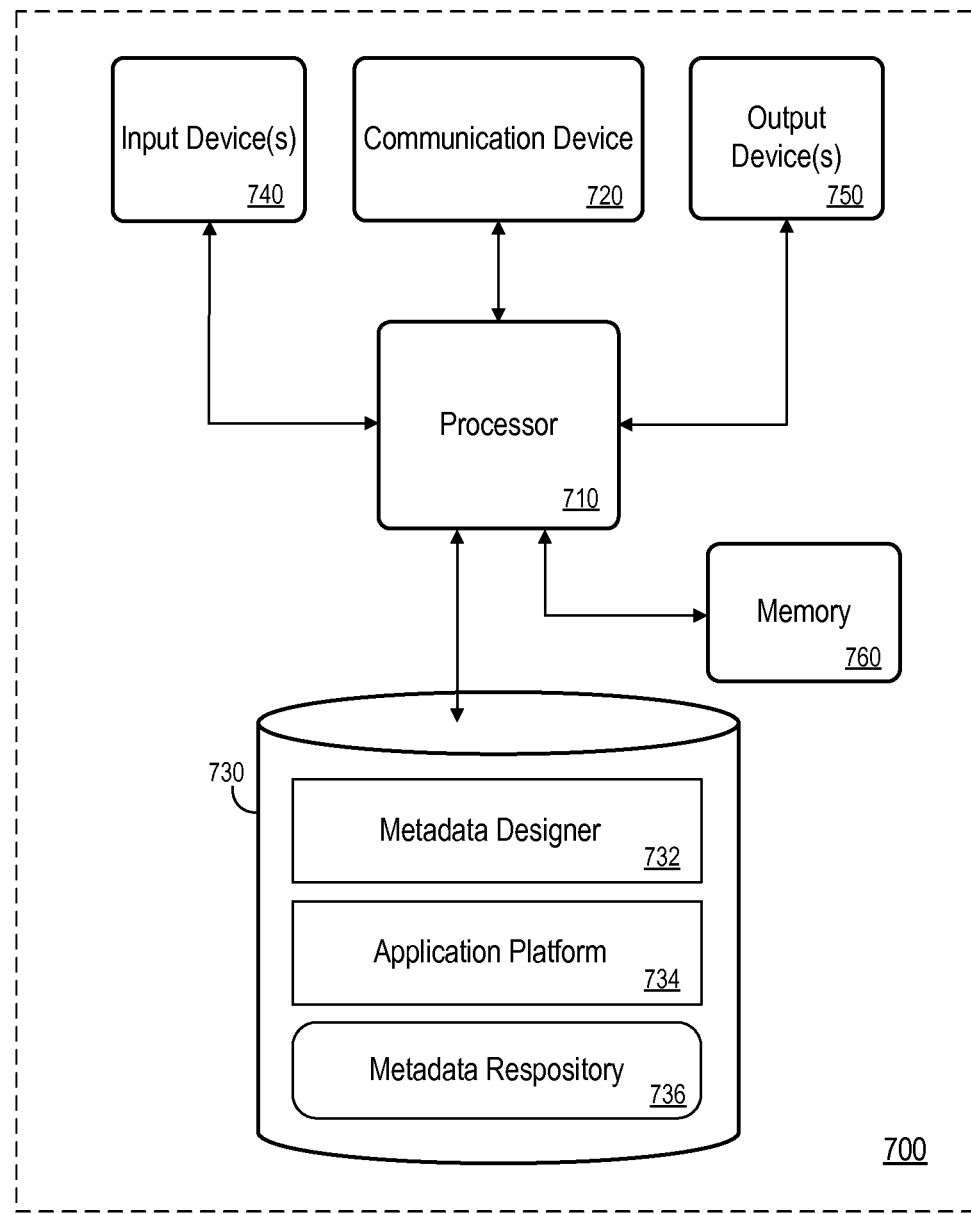
FIG. 7 is a block diagram of a computing device according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of application platform 110, metadata repository 150 and metadata designer 160. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as a reporting client or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code of metadata designer 732 and application platform 734 may be executed by processor 710 to cause apparatus 700 to perform any one or more of the processes described herein. Embodiments are not limited to execution of these processes by a single apparatus. Metadata repository 736 is also stored in data storage device 730, and may include program code as well as database tables and other elements as described with respect to architecture 200.

Data storage device 730 may also store data and other program code for providing additional functionality and/or which are necessary for operation thereof, such as device drivers, operating system files, etc.

Figure 8:
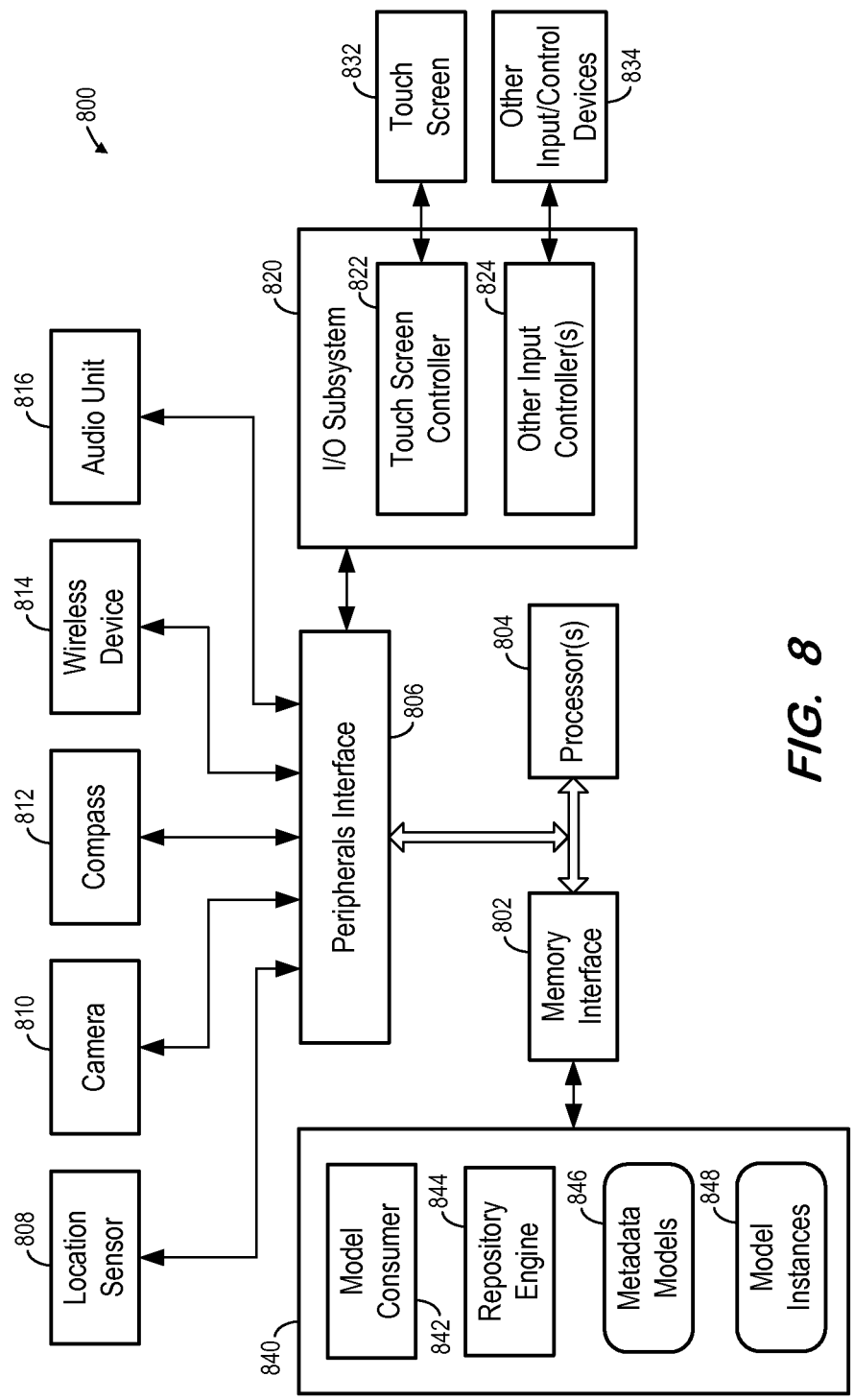
FIG. 8 is a block diagram of a mobile computing device according to some embodiments.

Apparatus 800 of FIG. 8 may comprise an implementation of mobile device 140 according to some embodiments. Apparatus 800 may therefore perform any of the processes attributed herein to mobile device 140.

Apparatus 800 may include memory interface 802, one or more microcontrollers, image processors and/or central processing units 804, and peripherals interface 806. Memory interface 802, one or more processors 804 and/or peripherals interface 806 may comprise separate components or can be integrated in one or more integrated circuits. The various components in apparatus 800 may be coupled to one another by one or more communication buses or signal lines.

Sensors, devices and subsystems can be coupled to peripherals interface 806 to facilitate multiple functionalities. For example, location sensor 808, camera 810, compass 812, wireless device 814, and audio device 816 may be provided to facilitate the collection, use and interaction with data and information and to achieve the functionality described herein. Some embodiments may provide additional peripheral devices, including but not limited to an accelerometer, a photoelectric device, and a proximity sensor.

Location sensor 808 may include circuitry and sensors for supporting a location determining capability, such as that provided by the Global Positioning System or other positioning system (e.g., systems using Wi-Fi access points, television signals, cellular grids, Uniform Resource Locators (URLs)). In some implementations, any peripheral (e.g., a Global Positioning System receiver) can be integrated into apparatus 800 or provided as a separate device that can be coupled to apparatus 800 through peripherals interface 806 to provide desired functions.

Camera 810 may be located on a back surface of apparatus 800. Camera 810 may capture still images and/or video. Compass 812 may determine an orientation of apparatus 800 with respect to compass headings, and wireless device 814 may include one or more wireless communication subsystems, such as an 802.11b/g communication device, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

Audio unit 816 may include a speaker and a microphone to facilitate voice-enabled functionalities, such as phone and voice mail functions. In some implementations, additional sensors or subsystems may be coupled to the peripherals interface 806 via connectors such as, for example a Universal Serial Bus (USB) port, or a docking port, or some other wired port connection.

I/O subsystem 820 may include touch screen controller 822 and/or other input controller(s) 824. Touch-screen controller 822 may be coupled to touch screen 832. Touch screen 832 and touch screen controller 822 may, for example, detect contact (i.e., touch input), movement (i.e., drag input) and release thereof using any of a plurality of touch-sensitivity technologies, including but not limited to capacitive, resistive, infrared, and surface acoustic wave technologies, as well as other proximity sensor arrays or other elements for determining one or more points of contact with touch screen 832. Other input controller(s) 824 may be coupled to other input/control devices 834, such as one or more buttons, rocker switches, thumb-wheel, infrared port, USB port, and/or a pointer device such as a stylus.

Memory interface 802 is coupled to memory 840. Memory 840 can include high-speed random access memory and/or non-volatile memory, such as one or more magnetic disk storage devices, one or more optical storage devices, and/or flash memory (e.g., NAND, NOR). Memory 840 may store program code of model consumer 842 and repository engine 844, which may be executed by processors 804 to cause apparatus 800 to perform the functions described herein. Memory 840 also stores metadata models 846 and object models 848 of persistency layer 320.

Memory 840 may store an operating system, such as Android, Darwin, RTXC, LINUX, UNIX, OS X, WINDOWS, or an embedded operating system such as VxWorks. The operating system may include instructions for handling basic system services and for performing hardware dependent tasks. In some embodiments, the operating system can be a kernel (e.g., UNIX kernel). Memory 840 may also store data, including but not limited to documents, images, video files, audio files, and other data.

The diagrams described herein represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices.

Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A computer-implemented system comprising:
a first system comprising:
a first processor;
a persistent storage; and
a non-transitory computer-readable medium storing program code executable by the first processor to:
create, in a first metadata repository of a backend system, a data structure for a first generic business object model, the first generic business object model being a metadata model that is an instance of a first meta-metadata model, wherein the first meta-metadata model comprises at least one of nodes, associations, elements structures, or attribute properties associated with the metadata model;
create, in the first metadata repository, a data structure of a first specific business object model based on the first generic business object model, wherein the first specific business object model is an object model that is an instance of the first generic business object model;

store, in the persistent storage of the first metadata repository, the first generic business object model and the first specific business object model;

create, in the first metadata repository, a data structure for a second generic business object model, the second generic business object model being a metadata model that is
 an instance of the first meta-metadata model, and
 a mobile-device format implementation of the first generic business object model;

create, in the first metadata repository, a data structure of a second specific business object model based on the second generic business object model, wherein the second specific business object model is an object model that is an instance of the second generic business object model;

store, in the persistent storage of the first metadata repository, the second generic business object model and the second specific business object model; and send the second generic business object model and the second specific business object model to a mobile device to be
 consumed by the mobile device, and
 synchronized with generic business object models and specific business object models stored in a second metadata repository on the mobile device.

2. A method implemented by a computing system in response to execution of program code by a processor of the computing system, the method comprising:

creating, in a first metadata repository of a backend system, a data structure for a first generic business object model, the first generic business object model being a metadata model that is an instance of a first meta-metadata model, wherein the first meta-metadata model comprises at least one of nodes, associations, elements structures, or attribute properties associated with the metadata model;

creating, in the first metadata repository, a data structure of a first specific business object model based on the first generic business object model, wherein the first specific business object model is an object model that is an instance of the first generic business object model;

storing, in the persistent storage of the first metadata repository, the first generic business object model and the first specific business object model;

creating, in the first metadata repository, a data structure for a second generic business object model, the second generic business object model being a metadata model that is
 an instance of the first meta-metadata model, and
 a mobile-device format implementation of the first generic business object model;

creating, in the first metadata repository, a data structure of a second specific business object model based on the second generic business object model, wherein the second specific business object model is an object model that is an instance of the second generic business object model;

storing, in the persistent storage of the first metadata repository, the second generic business object model and the second specific business object model; and sending the second generic business object model and the second specific business object model to a mobile device to be
 consumed by the mobile device, and
 synchronized with generic business object models and specific business object models stored in a second metadata repository on the mobile device.

3. A non-transitory computer-readable medium storing program executable instructions thereon, the medium comprising:

instructions to create, in a first metadata repository of a backend system, a data structure for a first generic business object model, the first generic business object model being a metadata model that is an instance of a first meta-metadata model, wherein the first meta-metadata model comprises at least one of nodes, associations, elements structures, or attribute properties associated with the metadata model;

instructions to create, in the first metadata repository, a data structure of a first specific business object model based on the first generic business object model, wherein the first specific business object model is an object model that is an instance of the first generic business object model;

instructions to store, in the persistent storage of the first metadata repository, the first generic business object model and the first specific business object model;

instructions to create, in the first metadata repository, a data structure for a second generic business object model, the second generic business object model being a metadata model that is
 an instance of the first meta-metadata model, and
 a mobile-device format implementation of the first generic business object model;

instructions to create, in the first metadata repository, a data structure of a second specific business object model based on the second generic business object model, wherein the second specific business object model is an object model that is an instance of the second generic business object model;

instructions to store, in the persistent storage of the first metadata repository, the second generic business object model and the second specific business object model; and instructions to send the second generic business object model and the second specific business object model to a mobile device to be
 consumed by the mobile device, and
 synchronized with generic business object models and specific business object models stored in a second metadata repository on the mobile format device.

* * * * *